US011323359B2

(12) United States Patent
Smith

(10) Patent No.: US 11,323,359 B2
(45) Date of Patent: May 3, 2022

(54) MULTI-CHANNEL COMMUNICATION

(71) Applicant: Cable Television Laboratories, Inc., Louisville, CO (US)

(72) Inventor: Luther E. Smith, Fort Lupton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 378 days.

(21) Appl. No.: 15/918,532

(22) Filed: Mar. 12, 2018

(65) Prior Publication Data

US 2019/0052560 A1 Feb. 14, 2019

Related U.S. Application Data

(60) Provisional application No. 62/542,437, filed on Aug. 8, 2017.

(51) Int. Cl.
*H04L 12/725* (2013.01)
*H04W 40/02* (2009.01)
*H04L 12/709* (2013.01)
*H04L 45/30* (2022.01)
*H04L 45/24* (2022.01)

(52) U.S. Cl.
CPC ............ *H04L 45/30* (2013.01); *H04L 45/245* (2013.01); *H04W 40/026* (2013.01)

(58) Field of Classification Search
CPC ..... H04L 45/30; H04L 45/245; H04W 40/026
See application file for complete search history.

(56) References Cited

U.S. PATENT DOCUMENTS

| 9,838,923 B1* | 12/2017 | Sitton | H04W 76/19 |
| 10,075,387 B1* | 9/2018 | Avasol | H04L 67/02 |
| 10,244,536 B1* | 3/2019 | Jiang | H04W 72/048 |
| 2006/0270339 A1* | 11/2006 | Mahany | H04B 1/692 455/3.01 |
| 2012/0052900 A1* | 3/2012 | Liu | H04W 72/02 455/515 |
| 2012/0057511 A1* | 3/2012 | Sivakumar | H04W 28/06 370/310 |
| 2013/0077554 A1* | 3/2013 | Gauvreau | H04W 72/0453 370/312 |

(Continued)

OTHER PUBLICATIONS

IEEE Std 802.11-2012 "Part 11: Wireless LAN Medium Access Control (MAC) and Physical Layer (PHY) Specifications" (Year: 2012).*

(Continued)

*Primary Examiner* — Brian Whipple
*Assistant Examiner* — James Ross Hollister
(74) *Attorney, Agent, or Firm* — Great Lakes Intellectual Property, PLLC

(57) ABSTRACT

Multi-channel communication over wired and/or wireless communication mediums is contemplated. The multi-channel communication may be of the type sufficient to facilitate data delivery utilizing two or more channels/paths associated with an access point configured to facilitate communications with a plurality of devices. The multi-channel communications may be controlled to maximize performance through limitations placed on communications permitted over one or more of the channels/paths.

20 Claims, 4 Drawing Sheets

(56) References Cited

U.S. PATENT DOCUMENTS

| | | | |
|---|---|---|---|
| 2013/0235884 A1* | 9/2013 | Mamidwar | H04L 25/14 370/468 |
| 2015/0208451 A1* | 7/2015 | Tzoreff | H04W 76/14 370/329 |
| 2015/0289299 A1* | 10/2015 | Abraham | H04W 12/0433 370/328 |
| 2016/0212755 A1* | 7/2016 | Cao | H04W 40/12 |
| 2016/0249267 A1* | 8/2016 | Ho | H04W 76/10 |
| 2017/0245297 A1* | 8/2017 | Wild | H04L 65/4069 |
| 2018/0234335 A1* | 8/2018 | Sridhar | H04L 69/163 |
| 2018/0270143 A1* | 9/2018 | Currivan | H04L 25/022 |

OTHER PUBLICATIONS

Traffic Separation Using Dual Wi-Fi Interface to Enhance WLAN System Throughput, Takayuki Nishio, Ryo Nishioka, Masahiro Morikura, and Koji Yamamoto, IEEE 2014.

* cited by examiner

MULTI-CHANNEL COMMUNICATION

CROSS-REFERENCE TO RELATED APPLICATIONS

This application claims the benefit of U.S. provisional application No. 62/542,437 filed Aug. 8, 2017, the disclosure of which is incorporated in its entirety by reference herein.

TECHNICAL FIELD

The present invention relates to multi-channel communication, such as but not necessarily limited to multi-channel communication of the type sufficient to facilitate data delivery utilizing two or more wireless and/or wired channels/paths associated with an access point configured to facilitate communications with a plurality of devices.

BACKGROUND

When a plurality of devices attempt to wiredly and/or wirelessly communicate over a communication medium, a collision can occur when more than one of the devices attempts to use the medium at the same time. Collisions can occur when two of the devices attempt to communicate upstream or downstream at the same time or during overlapping periods of time and collisions can occur when one of the devices attempts to communicate upstream or downstream at the same time or during overlapping periods of time when another of the devices attempts to communicate in the opposite direction. Collision avoidance, congestion control, carrier sense, request to send/clear to send (RTS/CTS) and other processes may be implemented over the communication medium to facilitate preventing or otherwise thwarting collisions or other communication disruptions associated with the devices interfering with each other. Such processes may require backoff timers, idle detection, scheduling and other techniques whereby use of the communication medium is halted or unutilized for communicating data and/or information and instead spent coordinating or ascertaining whether collision-less communications may be viable. The periods of time spent performing such assessments and other analyses can negatively affect throughput of the communication medium as it wastes use of the communication medium that could otherwise be spent communicating data and/or information other than that used to thwart collisions. One non-limiting aspect of the present invention contemplates ameliorating throughput degradation and/or other negative effects associated with communication mediums of the type utilizing some form of collision avoidance, etc. to facilitate preventing collisions.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
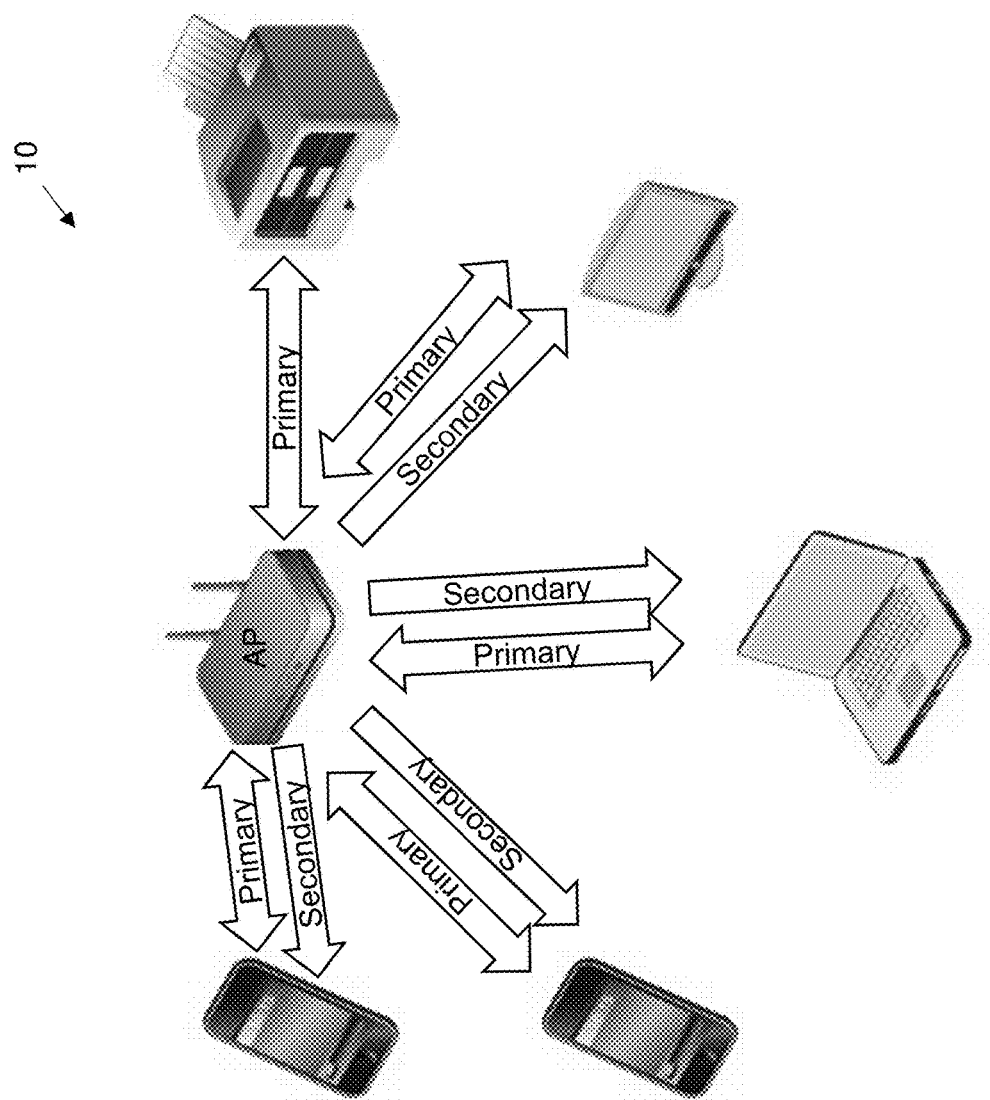
FIG. 1 illustrates a multi-channel communication system in accordance with one non-limiting aspect of the present invention.

FIG. 1 illustrates a multi-channel communication system 10 in accordance with one non-limiting aspect of the present invention. The communication system 10 may be characterized for exemplary purposes as multi-channel due to having an ability to separately or independently operate, support, configure, etc. multiple communication paths, signals, etc. between a plurality of devices and an access point (AP). The communications may occur over a related wired and/or wireless medium(s), such as to facilitate data delivery between the plurality of devices and/or between the plurality of devices and devices, servers, networks, etc. located outside/upstream of the AP. The AP may correspond with any AP, base station, node, gateway, interface, etc. positioned to facilitate exchanging signaling between one network and another and/or terminating or otherwise managing communications for a singular or unconnected network. The present invention is predominately described for exemplary non-limiting purposes with respect to the AP facilitating wireless communications with the plurality of devices and exchanging wireless and/or wired signaling therefrom with a service provider, such as but not necessary limited to an Internet service provider (ISP), a multiple system operator (MSO), a cellular communication provider, a cable television provider, a home network, a local area network (LAN), etc. with the AP being configured in accordance with the associated provider to facilitate the signal exchange with the plurality of devices.

One non-limiting aspect of the present invention contemplates facilitating the multi-channel communication with the AP supporting a primary channel and one or more secondary channels. The primary channel may be utilized to facilitate bidirectional/half-duplex communication according to Wi-Fi, LTE, Ethernet, MOAC, etc., such as to facilitate upstream and downstream communication of network traffic. The secondary channel may be utilized to facilitate limited half-duplex and/or non-duplex communications in so far as being limited to facilitating downstream but not upstream communication of network traffic. Collision avoidance, congestion control, carrier sense, request to send/clear to send (RTS/CTS) and other processes, such as that described in U.S. application Ser. No. 13/537,707, entitled Network Traffic Prioritization, the disclosure of which is hereby incorporated in its entirety by reference herein, may be employed to facilitate communications over the primary and secondary channels. Limiting the secondary channel to certain downstream communications may be beneficial in ameliorating the amount of time spent undertaking collision avoidance. This may result from the prohibition on upstream communication of network traffic essentially producing a contention-less environment that substantially eliminates a need for the AP to compete with the plurality of devices for resources. The AP may employ some of the backoff timers and other capabilities utilized on the primary channel to avoid collisions, such as to avoid collisions with neighboring APs, but those timers and factors may be comparatively shorter/less due to considerations and allocations for the plurality of devices being essentially unnecessary. The ability to operate the secondary channel without the additional messaging, burdens, bandwidth, etc. consumed by the primary channel in thwarting collisions may be beneficial in avoiding the related loss/consumption of time, network resources, etc. Those resources may then be used to instead improve throughput, quality of service (QOS), packet loss, reliability, etc. for the secondary channel in comparison to the primary channel, i.e., freeing additional capabilities of the secondary channel to facilitate data delivery instead of managing network communications.

The primary channel may operate over one frequency or multiple and/or ranges of frequencies separate from or otherwise differentiated from frequencies of the secondary channel, e.g., the same frequencies may be utilized by both the primary secondary channel at different times and/or the utilized frequencies may change overtime. The different channels may be utilized to facilitate simultaneously carrying data between the AP and the same one and/or different ones of the plurality devices, e.g., the AP may facilitate half-duplex communications over the primary channel while simultaneously transmitting downstream over the secondary channel. One non-limiting aspect of the present invention contemplates distinguishing network traffic from non-network traffic, such as according to whether the attendant communications are considered within the Open Systems Interconnection model (OSI model) to be layer-2 or data link layer traffic, which may be considered to be non-network traffic, or layer-4 or transport layer traffic, which may be considered to be network traffic. The differentiation of layer-2 and layer-4 communications, respectively referred to as non-network traffic and network traffic, may be optionally determined according to addressing associated with packets, frames, etc. being communicated, e.g., source and destination addresses for layer-2 communications may be devoid of Internet protocol (IP) addresses and instead utilize media access control (MAC) addresses whereas source and destination addresses for layer-4 communications may utilize IP addresses. The layer-2 or non-network traffic may be in the form of layer-2 acknowledgements required by the layer-2 protocol that is used on the channel.

Figure 2:
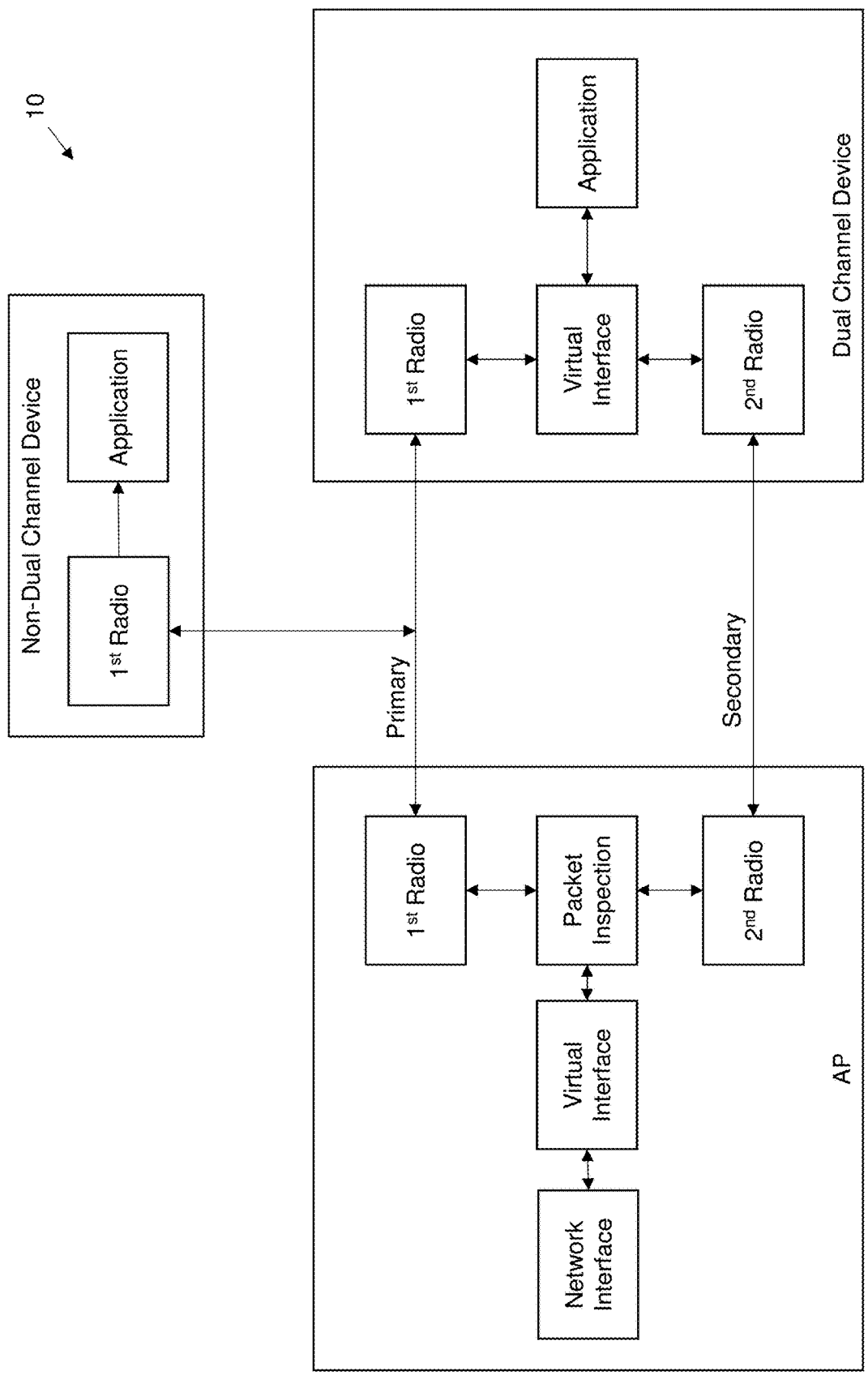
FIG. 2 illustrates a functional diagram of the multi-channel communication system in accordance with one non-limiting aspect of the present invention.

FIG. 2 illustrates communications between the AP, a first device and a second device in accordance with one non-limiting aspect of the present invention. The first device is shown for exemplary purposes to correspond with a non-dual channel device and the second device is shown to correspond with a dual channel device. The AP, first device and the second device are described for exemplary purposes with respect to facilitating wireless (Wi-Fi) communications in accordance with the Institute of Electrical and Electronics Engineers (IEEE) 802.11: Telecommunications and information exchange between systems—Local and metropolitan area networks—Specific requirements-Part 11: Wireless LAN Medium Access Control (MAC) and Physical Layer (PHY) Specifications, 2012, and/or other specifications within the IEEE 802.11 series, including but not necessary limited to 802.11k, 802.11u and 802.11v, the disclosures of which are hereby incorporated in their entireties by reference herein. Each of the AP, first device and the second device may include a non-transitory computer-readable medium having a plurality of non-transitory instructions stored thereon and executable with an included processor (not shown) to facilitate some or all of the operations contemplated herein. Each of the AP, first device and the second device are shown to include designators (rectangles) for illustrative purposes of representing hardware, software or other capabilities according to its attendant functionality.

The AP is shown to include a network interface, a virtual interface, a packet inspection feature and separate radios for facilitating communications with the devices, which for exemplary purposes are predominately described with respect to being packet-based communications, such as those associated with User Datagram Protocol (UDP) and Transmission Control Protocol (TCP). The network interface may include input/output components sufficient to facilitate wiredly and/or wirelessly exchanging packets with a wide area network (WAN) or other network/device in communication therewith. The virtual interface may provide an application interface for obfuscating interactions between the network interface and the packet inspection feature, such as to enable an application to communicate packets therebetween. The packet inspection feature may include a buffer and/or other constructs to facilitate processing of the packets being exchanged through the AP, such as to facilitate the multi-channel communications contemplated herein. The packet inspection feature is shown to facilitate exchanging packets between a first radio and a second radio of the AP, and optionally additional radios on the AP if available. The first radio may include capabilities for exchanging packets over the primary channel, and the second radio may include similar capabilities for exchanging packets over the secondary channel. The packet inspection feature may be operable to facilitate multiplexing (upstream) and demultiplexing (downstream) the corresponding packets relative to the network interface to enable the network interface to exchange the packets in a common transport stream. The packet inspection feature, which may determine which radio a packet should be sent to based on predefined filter settings when packets are destined for the dual channel device, is shown for exemplary purposes as it and/or the other illustrative components of the AP may be implemented through other elements, e.g., the virtual interface may be sufficient to facilitate exchanging packets between the network interface and the different radios.

The non-dual channel device is shown to include a first radio for exchanging packets with an application intending to make use thereof. The non-dual channel device is shown for exemplary purposes as being a non-dual channel device, which for illustrative purposes is assumed to lack a second radio or a radio capable of communicating with the second radio of the AP, e.g., the non-dual channel device may include a second radio but only one radio having capabilities sufficient to operate at frequencies utilized by the first and second radios of the AP. The dual channel device is shown to include a first radio and a second radio for exchanging packets with a virtual interface suitable for interacting with an application intending to make use thereof. The first and second radios may correspond with the first and second radios of the AP and/or include capabilities commensurate with the first and second radios of the AP so as to facilitate exchanging packets therewith. The virtual interface may be an application layer construct or logical element capable of facilitating processing of exchange packets between the first and second radios in a manner obfuscated to the application so as to enable the application to process exchanged packets without regard to whether the packets have been or will be exchanged through the first or second radios, e.g. in a downstream direction the application may receive packets from the virtual interface without identifying the radio used to deliver the packets thereto, and in an upstream direction the application may transmit packets to the virtual interface without identifying the radio being used thereafter to transmit the packets to the AP.

Figure 3:
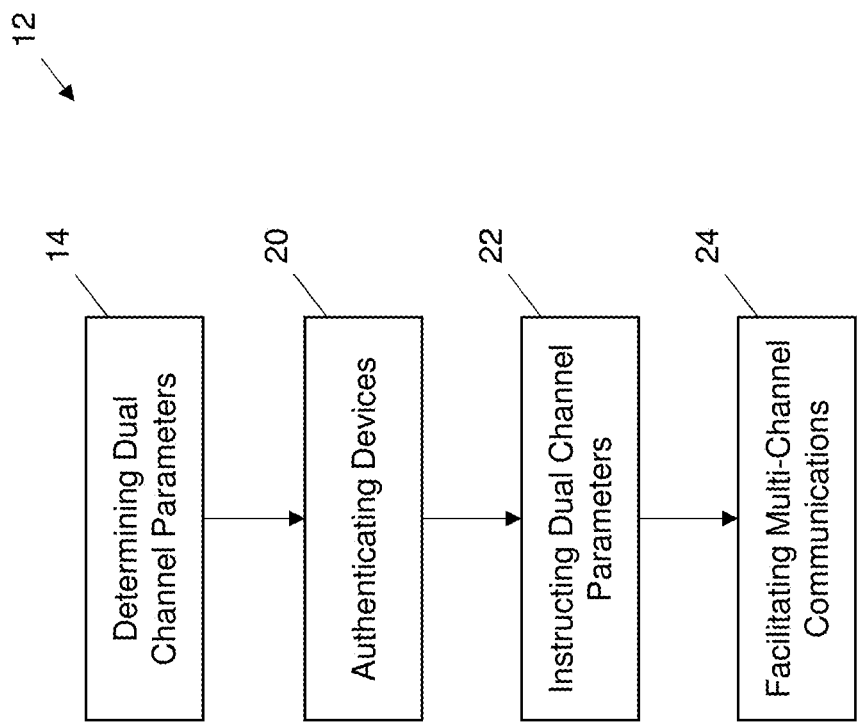
FIG. 3 illustrates a flowchart of a method for facilitating multi-channel communications in accordance with one non-limiting aspect of the present invention.

FIG. 3 illustrates a flowchart 12 of a method for facilitating multi-channel communication in accordance with one non-limiting aspect of the present invention. The method may be beneficial when any number of channels are utilized to facilitate wired and/or wireless communications and is predominately described for exemplary purposes with respect to environments where two wireless channels may be utilized for communications between an AP and a plurality of devices, such as in the above-described system 10. Block 14 relates to determining dual channel parameters utilized in accordance with the present invention to facilitate the multi-channel communication. The parameters may be determined to facilitate selectively controlling communications permitted over certain channels in order to maximize efficiency, throughput or other operational characteristics. One non-limiting aspect of the method contemplates selectively controlling the types of communications permitted over a primary channel and a secondary channel in a dual channel environment, e.g., permitting certain types of communications over one of the channels but not the other one of the channels. Disparately controlling the communications permitted over each of the channels may be beneficial in maximizing performance and improving performance in comparison to dual channel environments where the types of communications permitted over each channel are not similarly controlled, e.g., when both channels are permitted to engage in the same types of communications.

The ability of the present invention to selectively control particular types of communications permitted over the primary channel and the secondary channel may be beneficial in achieving heightened performance through amelioration of the amount of time collectively spend by the AP and the devices contending for access to the secondary channel. Limiting the secondary channel to facilitate download of certain types of communications, for example, can free the secondary channel to more quickly transmit the corresponding data than it would otherwise be able to do in the event corresponding transmissions were controlled in a manner identical to or commensurate with the primary channel, e.g., using the same contention time and/or processes utilized over the primary channel. One non-limiting aspect of the present invention contemplates selectively controlling communications permitted over the primary channel and that secondary channel by permitting the primary channel to support upstream and downstream transmission of network traffic while limiting the secondary channel to only downstream transmission of network traffic. The contemplated network traffic may be used to characterize virtually any type of data transmission differentiated from non-network traffic. The non-network traffic may be characterized as radio acknowledgments or other layer-2 or data link layer traffic necessary to facilitate certain types of wireless communications, such as those compliant with the above-referenced Wi-Fi specifications. The non-network traffic may be optionally characterized as that associated with packets, frames or other messages transmitted to confirm delivery of data (network traffic) without being dependent on assessing or otherwise interpreting contents or information within the data being confirmed.

The network traffic may correspond with layer-4 or transport layer traffic/communications utilized to facilitate transmission of data intended to be processed by an application, including attendant network acknowledgments and other confirmations utilized to apprise the related applications of communication statuses. The network traffic may be communicated according to TCP whereby buffers or other devices/applications processing TCP packets (network traffic) transmit responsive network acknowledgments (network traffic) at a fixed frequency or on a sliding scale, e.g., the rate/frequency of network acknowledgments may vary depending on the success of packet deliveries. The device transmitting the network acknowledgments (network traffic) to confirm receipt of TCP packets or other packets may additionally transmit radio acknowledgments (non-network traffic) depending on its particular configuration, e.g., a radio or other interface processing the network traffic may be configured to issue radio acknowledgments (non-network traffic) depending on receipt of layer-2 frames being used to carry the desired transmission (network traffic). The radio acknowledgments may be issued in addition to the network acknowledgments due to layer-2 related protocols requiring a corresponding radio interface to acknowledge frame receipt and layer-4 related protocols requiring a corresponding application utilizing the TCP packets or other data included within the layer-2 frames to acknowledge corresponding processing thereof. The frequency of the radio acknowledgments may differ from the frequency of the network acknowledgments depending on protocols and/or other operating parameters.

Figure 4:
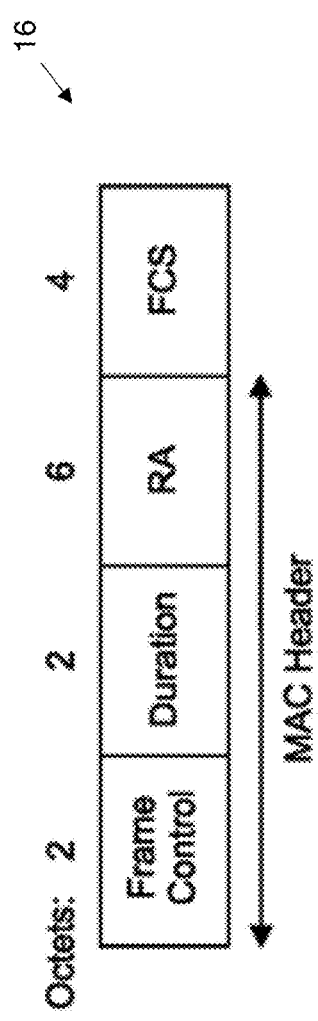
FIG. 4 illustrates a radio acknowledgment in accordance with one non-limiting aspect of the present invention.
Figure 5:
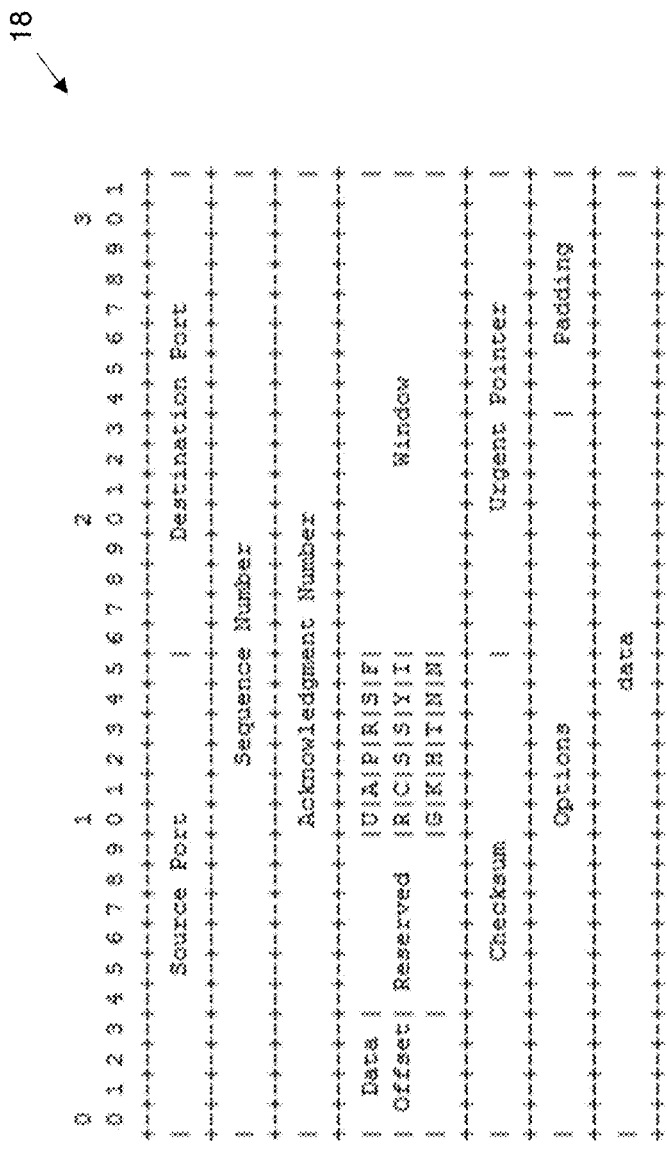
FIG. 5 illustrates a networking acknowledgment in accordance with one non-limiting aspect of the present invention.

FIG. 4 illustrates a radio acknowledgment 16 in accordance with one non-limiting aspect of the present invention. FIG. 5 illustrates a networking acknowledgment 18 in accordance with one non-limiting aspect of the present invention. The radio acknowledgment and the network acknowledgment are presented for exemplary purposes to illustrate differences between acknowledgments considered as non-network traffic (radio acknowledgment) and acknowledgments considered as network traffic (network acknowledgment). The radio acknowledgment is illustrated in accordance with IEEE specification 802.11-2012 and the network acknowledgment is illustrated in accordance with the TCP suite of protocols. The radio acknowledgment may be slavishly generated without assessing information/data included within a corresponding payload and may be smaller than the network acknowledgment. An RA field of the ACK frame may copied from the Address 2 field of the immediately previous individually addressed data, management, BlockAckReq, BlockAck, or PS-Poll frames, i.e., a MAC address included within a layer-2 frame triggering the radio acknowledgment. The remaining fields in the radio acknowledgment may be devoid or otherwise omit IP addresses, such as the IP addresses utilized within a source port field and a destination port field of the network acknowledgment. Detail regarding the nature of the additional fields illustrated in FIGS. 4 and 5 may be found in the corresponding documentation of the related specification and protocol, the disclosure of which are hereby incorporated by reference in their entireties.

In addition to determining differences or characterizations sufficient for differentiating network traffic from non-network traffic, the dual channel parameters may also be determined to facilitate implementing a filter sufficient for filtering the network traffic and/or the non-network traffic at the AP and/or the devices. The corresponding parameters may be used to set filter rules and/or filter variables for packet size, destination ports, protocol, tags or a combination these or other variables. The filter variables and/or filter rules may be utilized by the virtual interfaces and/or the packet inspection features to facilitate processing communications and/or otherwise generating routing tables or procedures for communicating over the primary and secondary channels in the contemplated manner. One non-limiting aspect of the present invention contemplates utilizing the filter to facilitate processing necessary to determine whether data being transmitted between the AP and the devices should be communicated over the primary channel or the secondary channel. At least with respect to the dual channel devices, the filter can be utilized by the AP to facilitate selecting one and/or both of the primary and secondary channels to facilitate downstream transmissions to the individual devices.

The filter may implement corresponding decisions depending on whether the filter variables exceed a corresponding threshold, such as to utilize: (1) destination port/addresses to determine whether communications are destined for a dual channel or non-dual channel device, e.g., to direct all communications over the primary channel for non-dual channel devices; (2) packet size to direct packet sizes exceeding a threshold over the secondary channel; (3) protocol/data type to default particular protocol/data types to the secondary channel and others to the primary channel; (4) network performance characteristics reflective of overall network performance, i.e. network throughput measured from combining performance of both the primary and secondary channels, to determine whether communications should be directed over the primary or secondary channel, e.g., to transmit entirety of communications over the selected one of the primary and secondary channels and/or to partition communications, i.e. transport streams of packet flows, destined for one device over both of the primary and secondary channels e.g., to facilitate partially transmitting communications over both of the primary and second channels to a particular device; and/or (5) using content type, such as for identifying be video data, music data, or other data where large volumes of data need to be moved, to route higher throughput-dependent content types over the secondary channel. The filter may use these variables to generate rules and tests for generating corresponding results, such as a first result when appropriate to communicate over the primary channel and a second result when appropriate to communicate over the secondary channel.

Block 20 relates to authenticating the devices for communications with the AP. The authentication process may include the AP comparing AP radio capabilities relative to device radio capabilities for purposes of assessing whether the devices should be considered as dual channel or non-dual channel devices. In the event the AP utilizes 2.4 GHz for the primary channel and 5.0 GHz for the secondary channel, the authentication process may include the AP determining whether the devices include capabilities for supporting 2.4 GHz and 5.0 GHz frequency bands. This authentication process may further include assessing additional radios and capabilities of the AP and the devices, such as to determine whether the device can support additional frequencies, e.g., 60 GHz, for purposes of facilitating communications over a tertiary channel or more channels. The additional channels beyond the primary and secondary channels may optionally operate in an identical manner to the secondary channel (aside from different frequency ranges) and/or further filters may be applied thereto to control channel routing, e.g., the secondary channel may be utilized for one type of content, such as voice data, and the tertiary channel operating at a higher frequency and/or throughput may be utilized for another type of content, such as more volume dependent content like video data.

The authentication process may optionally include processes for facilitating communications according to Access Network Query Protocol (ANQP), including use of an ANQP vendor specific field to communicate to the AP if a device can support the dual band functionality. ANQP responses may be utilized to include information from the AP as to the secondary channel to be used, such as a service set identifier (SSID) and access method to be used. The AP may optionally use these capabilities to allow the secondary channel to be a "hidden" SSID and make use of access methods that would not need to be publicly known, which may be beneficial in thwarting snooping or packet monitoring in the event the secondary channel facilitate communication of data design enhanced security. At any time, any associated device that supports the dual band could be signaled by the AP again using ANQP messages to switch between one of a plurality of sub-channels within the secondary channel, i.e., the secondary channel may include multiple sub-channels at different sub-frequencies associated with the corresponding frequency band. These would allow the AP to selectively put various devices on different secondary channels, which could be done as a result of new traffic being sent to devices producing a need to balance out the traffic flow on each available secondary channel.

Block 22 relates to the AP instructing the devices with respect to the relevant dual channel parameters. Corresponding instructions may include providing the devices one or more SSIDs depending on whether the devices are able to facilitate communications over one or both of the primary and secondary channels, filtering or routing instructions for upstream and/or downstream communications and other operating instructions necessary to facilitate the operations contemplated herein. The instructions may optionally be utilized to facilitate configuring the virtual interface of the devices to provide an automated mechanism for processing downstream communications received over either one of the radios and to facilitate upstream communications over either one of the radios. One non-limiting aspect of the present invention contemplates instructing the devices to limit certain types of communications being communicated upstream over the secondary channel to ameliorate contention time and other time spent arbitrating access to the secondary channel. The limitations placed upon communications over the secondary channel may be implemented so that all network traffic communications occur over the primary channel, thereby freeing the secondary channel to maximize capabilities for supporting downstream communications. The devices may be instructed in this manner to transmit some upstream, non-network traffic communications over the secondary channel, such as to enable radio acknowledgments, and to transmit all other upstream network traffic, such as network acknowledgments and transport streams originating at the devices, solely over the primary channel.

Block 24 relates to facilitating multi-channel communications in the manner contemplated by the present invention to enable maximization of communication capabilities within a networking environment employing the primary and secondary channels and/or additional channels. One non-limiting aspect of the present invention contemplates utilizing the dual channel parameters and the processes for authenticating and instructing the devices to produce a networking architecture whereby the AP may be able to selectively determine communications for transmission over the primary and secondary channels, such as to prevent the devices from communicating anything but non-network traffic upstream over the secondary channel for purposes of freeing the secondary channel from contention or access restraints associated with the primary channel, which may then enable the secondary channel to be used to maximize throughput for communications occurring downstream over the secondary channel. The restriction on the devices from transmitting certain communications upstream over the secondary channel may be sufficient to allow the AP to effectively arbitrate all communications over the secondary channel without having to take into consideration upstream communication requests of the devices. The radio acknowledgments may be of such a nature that their transmission upstream over the secondary channel can be considered as insufficient or irrelevant in so far as affecting contention or access processes used to govern use of the secondary channel, at least with respect to how the corresponding metrics are used to govern access to the primary channel.

The multi-channel communications may be facilitated in accordance with the present invention by freeing the secondary channel from the contention or usage constraints otherwise employed on the primary channel. The resulting effect may be to enable the AP with capabilities to selectively control the transmission of downstream communications over the secondary channel without having to consume or delay use of airtime or other network resources for purposes of assessing whether any upstream communications are likely to collide therewith or otherwise adversely affect the communication thereof. One non-limiting aspect of the present invention particularly contemplates maximizing capabilities of the AP to utilize a secondary channel in an efficient manner by requiring the devices to transmit any acknowledgments but the radio acknowledgments over the primary channel regardless of whether the attendant communications were provided thereto over the primary or secondary channel. The AP may instruct and/or the devices may be otherwise controlled, such as through the filter parameters or routing tables, to prevent transmitting network traffic upstream over the secondary channel. One non-limiting aspect of the present invention contemplates the virtual interfaces the devices and the AP being obfuscated from the applications employ the use thereof such that the applications are unaware of the radio being used to transmit upstream/downstream communications, which through the noted programming thereof, enables use of the primary secondary channels for downstream network traffic and prevents the use thereof for network traffic, i.e., the filters, routing tables, etc. may be utilized to facilitate enabling and disabling/preventing communications over the primary and secondary channels.

As supported above, one non-limiting aspect of the present invention relates to a Dual Channel Wi-Fi implementation for making use of two or more wireless or wired channels/paths for the delivery of data to endpoints, which may be utilized to create two or more separate non-conflicting paths of data delivery. In the case of Wi-Fi only devices, two or more Wi-Fi channels may be employed with one of the channels used as a primary channel and the remaining channels used for downstream only data transport. The focus of the Dual Channel Wi-Fi could be used over any combination of data transport mediums ranging from Wi-Fi and LTE to Ethernet and MOAC. The primary path or channel may operate in a normal fashion allowing both Dual Channel capable devices and legacy devices to communicate with no impact to current implementations. Dual Channel enabled devices may make use of a second or more paths or channels strictly for the downstream of classified data/traffic. One aspect of the Dual Channel operation may be to allow the downstream source the full availability of the downstream paths without having to contend for a transmit opportunity, which may be accomplished by using as unused or lightly used path/channel for downstream while normal traffic exchange is done over the primary path/channel. Through an exchange of control messages with the AP or Router and device can setup the downstream only path/channel that the AP then based on preconfigured filtering rules may direct downstream data either on the primary path/channel or the downstream path/channel. All upstream data may be limited/sent on the primary path/channel to enable the AP or router full time access to the downstream path/channel without the delays resulting from upstream data and/or related collisions with downstream data While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for dual channel communications comprising:
    enabling downstream and upstream communication of network traffic for a first device over a primary channel of an access point, including limiting communication of resulting network and radio acknowledgements to the primary channel; and
    enabling downstream only communication of network traffic for the first device over a secondary channel of the access point, including limiting communication of resulting radio acknowledgements to the secondary channel and communication of resulting network acknowledgments to the primary channel.

2. The method of claim 1 further comprising:
    the network traffic and the network acknowledgments being layer-4 communications such that the first device is enabled to undertake upstream and downstream communication on the primary channel over layer-4 while being prevented from undertaking upstream communication on the secondary channel over layer-4; and
    the radio acknowledgments being layer-2 communications such that the first device is enabled to undertake upstream communication on the primary channel over layer-2 while being enabled to undertake upstream communication on the secondary channel over layer-2.

3. The method of claim 2 further comprising:
    determining the first device from one of a plurality of devices authenticated with the access point, the first device having multi-channel capabilities sufficient to simultaneously communicate with the access point over both of the primary and secondary channels;
    determining a second device from one of the plurality of devices, the second device having single-channel capabilities and lacking multi-channel communication capabilities, the second device being incapable of simultaneously communicating over the primary and secondary channels;
    and
    prohibiting the second device from communicating over the secondary channel such that the second device is limited to upstream and downstream communication only over the primary channel, thereby limiting the second device to communicating only on the primary channel over both layer-2 and layer-4 such that all network traffic, network acknowledgments and radio acknowledgements are communicated over only the primary channel.

4. The method of claim 3 further comprising limiting communications via the secondary channel to wireless communications in compliance with the 802.11 series of specifications.

5. The method of claim 3 further comprising limiting communications via the primary channel and the secondary channel to wireless communications in compliance with the 802.11k, 802.11u or 802.11v of the 802.11 series of specifications such that communications over the primary channel and the secondary channel occur without deviation from the 802.11k, 802.11u or 802.11v specifications.

6. The method of claim 2 further comprising:
the first device having first and second radios respectively supporting wireless communications over the primary and secondary channels;
limiting the first device to communicate the network acknowledgments associated with the secondary channel through the first radio; and
limiting the first device to communicate the radio acknowledgments associated with the secondary channel through the second radio.

7. The method of claim 6 further comprising the first device slavishly communicating the radio acknowledgments associated with the secondary channel without assessing information/data included within a payload associated therewith.

8. The method of claim 7 further comprising the first device communicating the network acknowledgments associated with the secondary channel based on an assessment of information/data included within a payload associated therewith.

9. The method of claim 1 further comprising wiredly communicating via the primary channel and the secondary channel.

10. The method of claim 1 further comprising executing contention processes associated with avoiding collisions when communicating network traffic over the primary and secondary channels, including setting backoff timers associated with the contention processes to be less for network traffic communicated over the secondary channel than for network traffic communicated over the primary channel, the backoff timers specifying a duration the primary and secondary channels must be unused before communication of network traffic is permitted.

11. The method of claim 10 further comprising when a frequency for communications over the secondary channel overlaps with at least one frequency simultaneously in use at a neighboring access point, the neighboring access point operating independently from the access point and incapable of being controlled by the access point, executing the contention processes to avoid collisions with the neighboring access point at the frequency.

12. A method for multi-channel communications comprising:
authenticating a plurality of devices to bidirectionally exchange primary traffic with an access point over a primary channel, including instructing the plurality of devices to perform an inspection process to differentiate between network and radio acknowledgments such that all network and radio acknowledgments associated with the primary traffic are communicated only over the primary channel; and
authenticating the plurality of devices to unidirectionally receive secondary traffic from the access point over a secondary channel, including instructing the plurality of devices to perform the inspection process to differentiate between radio and network acknowledgments such that all radio acknowledgements associated with the secondary traffic are communicated to the access point only over the secondary channel and all the network acknowledgments associated with the secondary traffic are communicated to the access point only over the primary channel.

13. The method of claim 12 further comprising instructing the plurality of devices to communicate the radio and network acknowledgments in compliance with the 802.11a series of specifications, including instructing the plurality of devices to communicate the radio acknowledgments only over layer-2 and to communicate the network acknowledgments only over layer-4.

14. A multi-channel communication access point (AP) comprising:
a first radio providing wireless communications over a primary channel;
a second radio providing wireless communications over a secondary channel;
and
a computer-readable medium having a plurality of non-transitory instructions, the non-transitory instructions being executable with a processor of the access point to:
i) partition downstream network traffic intended for communication to a first device such that the downstream network traffic is at least periodically communicated over the primary channel and at least periodically communicated over the secondary channel;
ii) instruct the first device to communicate all network acknowledgments resulting from the downstream network traffic only over the primary channel such that all the network acknowledgments resulting from the downstream network traffic communicated over both of the primary and secondary channels are only communicated over the primary channel;
iii) instruct the first device to communicate radio acknowledgments over the primary channel when resulting from the downstream network traffic communicated over the primary channel; and
iv) instruct the first device to communicate radio acknowledgments over the secondary channel when resulting from the downstream network traffic communicated over the secondary channel.

15. The AP of claim 14 wherein the non-transitory instructions are executable with the processor to:
determine a second device having single-channel capabilities, the single-channel capabilities limiting the second device to simultaneous communications over no more than one of the primary and secondary channels;
determine the first device as having multi-channel capabilities, the multi-channel capabilities permitting the first device to simultaneous communications over both of the primary and secondary channels;
instruct the first and second devices to communicate upstream network traffic intended for the AP over only the primary channel; and
prevent the second device from any access to the secondary channel.

16. The AP of claim 15 wherein the second radio utilizes a hidden service set identifier (SSID) to hide the secondary channel from the second device.

17. The AP of claim 14 wherein the non-transitory instructions are executable with the processor to perform packet inspection on the downstream network traffic, the packet inspection partitioning corresponding data packets between the primary and secondary channels according to a plurality of filters, the plurality of filters including an address filter, a packet size filter, a protocol/data type filter, a network performance filter and/or a content type filter.

18. The AP of claim 14 wherein the non-transitory instructions are executable with the processor to provide parameters to a virtual interface of the first device, the parameters instructing the virtual interface to differentiate between the radio acknowledgments and the network acknowledgements such the virtual interface correspondingly controls the first device to:
  i) communicate all network acknowledgments only over the primary channel;
  ii) communicate the radio acknowledgments only over the primary channel when resulting from the downstream network traffic communicated over the primary channel; and
  iii) communicate the radio acknowledgments only over the secondary channel when resulting from the network traffic communicated over the secondary channel.

19. The AP of claim 18 wherein the radio acknowledgments are communicated over layer-2 and the network acknowledgments are communicated over layer-4 in compliance with the 802.11 series of specifications.

20. The AP of claim 18 wherein the non-transitory instructions are executable with the processor to provide the parameters only to the virtual interface such that the parameters are obfuscated from an application operating on the first device, the application generating the radio and network acknowledgments without regard as to whether the radio and network acknowledgments are thereafter communicated over the primary and secondary channels.

* * * * *